United States Patent [19]

Inagami et al.

[11] Patent Number: 4,488,247
[45] Date of Patent: Dec. 11, 1984

[54] CORRECTION CIRCUIT FOR APPROXIMATE QUOTIENT

[75] Inventors: Yasuhiro Inagami, Hadano; Shigeo Nagashima, Hachioji; Koichiro Omoda, Hadano; Shunichi Torii, Musashino, all of Japan

[73] Assignee: Hitachi, Ltd., Tokyo, Japan

[21] Appl. No.: 366,325

[22] Filed: Apr. 7, 1982

[30] Foreign Application Priority Data

Apr. 15, 1981 [JP] Japan .................................. 56-55549

[51] Int. Cl.³ .............................................. G06F 7/52
[52] U.S. Cl. ................................................. 364/765
[58] Field of Search ........................................ 364/765

[56] References Cited

U.S. PATENT DOCUMENTS

| | | | |
|---|---|---|---|
| 3,508,038 | 4/1970 | Goldschmidt et al. | 364/765 |
| 3,633,018 | 1/1972 | Ling | 364/765 |
| 3,648,038 | 3/1972 | Sierra | 364/765 |
| 3,777,132 | 12/1973 | Bennett, Jr. | 364/765 |
| 4,364,115 | 12/1982 | Asai | 364/765 |

Primary Examiner—David H. Malzahn
Attorney, Agent, or Firm—Antonelli, Terry & Wands

[57] ABSTRACT

An approximate quotient-correcting circuit wherein an approximate quotient $Q_H$, a divisor D, and the least significant bit of the fraction part of a dividend N are read out; the approximate quotient $Q_H$ and the divisor D are multiplied; it is decided whether the lower m digits of $Q_H \times D$ are not all '0' and whether the m-th significant bit of $Q_H \times D$ is coincident with the m-th significant bit of N; and when the result of the decision is positive, $Q_H - 2^{-m}$ is provided as a quotient.

9 Claims, 3 Drawing Figures

CORRECTION CIRCUIT FOR APPROXIMATE QUOTIENT

BACKGROUND OF THE INVENTION

The present invention relates to a circuit for correcting an approximate quotient in a data processor which adopts a division method for obtaining an approximate quotient by repeated multiplications.

In obtaining a quotient $q = N/D$ where N denotes a dividend and D denotes a divisor, the method puts:

$$q = \frac{N}{D} = \frac{N \times R_0 \times R_1 \times R_2 \times \ldots}{D \times R_0 \times R_1 \times R_2 \times \ldots} \quad (1)$$

and finds $R_0, R_1, R_2, \ldots$ bringing $D \times R_0 \times R_1 \times R_2 \times \ldots$ close to 1 (one), thereby to obtain:

$$q \approx N \times R_0 \times R_1 \times R_2 \times \quad (2)$$

The first $R_0$ is the approximate value of the reciprocal of D, and is obtained from a table which stores $R_0$ in a pair with D in advance. Letting $D \times R_0 = 1 - \epsilon$ and $0 \leq |\epsilon| < 1$, $R_1$ is obtained by:

$$R_1 = 2 - D \times R_0 = 1 + \epsilon \quad (3)$$

and the following holds:

$$D \times R_0 \times R_1 = (1-\epsilon)(1+\epsilon) = 1 - \epsilon^2 \quad (4)$$

Subsequently, putting $R_2 = 2 - D \times R_0 \times R_1 = 1 + \epsilon^2$, the following holds:

$$D \times R_0 \times R_1 \times R_2 = (1-\epsilon^2)(1+\epsilon^2) = 1 - \epsilon^4 \quad (5)$$

By repeating such operations, $D \times R_0 \times R_1 \times R_2 \times \ldots \times R_n \to 1$ can be established. Assuming now that $\epsilon^4$ has become less than or equal to the number of significant digits finally required for a quotient, $$q' = N \times R_0 \times R_1 \times R_2 \quad (6)$$

is the approximate quotient to be found.

In case of obtaining the quotient with the above method, $$q = \frac{N \times R_1 \times R_1 \times R_2}{1 - \epsilon^4} \quad (7)$$

holds, or $$N \times R_0 \times R_1 \times R_2 = q(1 - \epsilon^4) \quad (8)$$

holds. Therefore, when $q' = N \times R_0 \times R_1 \times R_2$ is deemed the quotient, an error of $q \times \epsilon^4$ develops between the approximate quotient $q'$ and the true quotient q. For this reason, even when the true quotient q is a divisible value, the approximate quotient $q'$ is indivisible in some cases. Accordingly, even when the true quotient q is the divisible value, the approximate solution $q'$ can become unequal to the true value. (With a method performing a division by repeating subtractions, a quotient equal to the true quotient q is obtained whenever the latter is divisible.) Accordingly, the approximate solution $q'$ obtained with the division method employing the reciprocal as above stated needs to be corrected in order that a quotient equal to the true quotient q may be obtained infallibly when the latter is the divisible value.

The approximate quotient $q'$ is expressed by $q' = q(1 - \epsilon^4)$, and the multiplications need to be repeated until $q \times \epsilon^4$ becomes a value smaller than the least significant bit of the quotient. Hereinbelow, the division of data in the floating point notation will be described unless otherwise specified. In this case, subtractions are performed as to an exponent part, and a division is performed as to a fraction part. In the following, accordingly, the fraction part of the dividend N shall be simply called the "dividend N", while that of the divisor D shall be simply denoted by the divisor D, and the fraction part of the true quotient q shall be simply denoted by the true quotient q, while that of the approximate quotient $q'$ shall be simply called the "approximate quotient $q'$". It is now supposed that the number of significant digits of the fraction part of the floating point data is m, and that the approximate quotient $q'$ is evaluated at a precision of (m+n) digits so that the value of $q \times \epsilon^4$ may become smaller than the value of a place which is n digits ($n \geq 1$) still lower than the least significant bit in the floating point notation. At this time, there is the possibility that an error of $\pm 1$ will occur at the (m+n)-th digit. Whether the error becomes 0, +1 or −1, depends upon the data directed toward the division.

Figure 1:
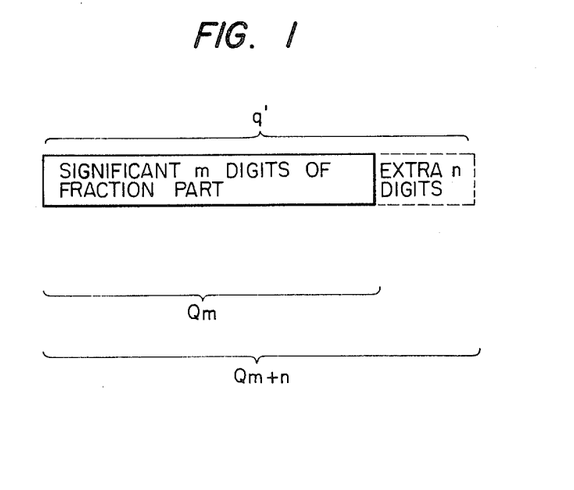
FIG. 1 is a diagram showing the data format of an approximate quotient.

Here, the value of the m significant digits of the true quotient q is denoted by $q_m$. Further, as shown in FIG. 1, the value of the upper m digits of the approximate quotient $q'$ obtained at the precision of the (m+n) digits is denoted by $Q_m$, while the value of the (m+n) digits, including extra n digits, of the approximate quotient $q'$ is denoted by $Q_{m+n}$.

When the error is 0 (zero), $q_m = Q_m$ holds, and any correction is unnecessary.

When the error is +1, 1 (one) needs to be subtracted from the lowest digit of $Q_{m+n}$. This subtraction causes a change in $Q_m$ only in a case where the extra n digits are all '0'. At this time, a correction of $Q_m - 2^{-m}$ is necessary.

When the error is −1, 1 (one) needs to be added to the lowest digit of $Q_{m+n}$. This addition causes a change in $Q_m$ only in a case where the extra n digits are all "1". At this time, a correction of $Q_m + 2^{-m}$ is necessary.

Accordingly, the correction is required only in the case where the n digits obtained in excess of the m significant digits in the floating point notation are all '0' or all '1'.

Which of 0, +1 and −1 conditions of error occur, depends upon the data and is difficult to determine in the course of the division processing. Therefore, the following correction method has heretofore been adopted.

By repeating the multiplications to the precision at which the error develops at the place which is n digits lower than the m significant digits, an approximate quotient $Q_{m+n}$ consisting of the (m+n) digits is obtained. A value obtained by adding 1 (one) to the lowest digit ((m+n)-th digit) of $Q_{m+n}$ and discarding places below the m-th digit, is provided as a corrected approximate quotient $Q_H$. As a result, the correction in the case where the error is −1 and where the extra n digits are all '1' can be made. When the extra n digits are neither all '0' nor all '1', $q_m$ of the true quotient q and $Q_m$ become equal as in the case where no correction is made.

By performing this correction, when the true quotient is the divisible value, the final approximate solution is ensured to become equal to the true quotient. However, all the corrections are not covered, but the corrected approximate quotient $Q_H$ becomes greater than the true value in (1) a case where the extra n digits are all '1' and where the error of 0 or +1 exists and (2) a case where the extra n digits are all '0' and where the error of +1 exists. As a result, a problem to be stated below arises. With the hitherto known method which evaluates the quotient by repeating the subtractions, the sign of a remainder is identical to that of the dividend. For example, in a case where both the dividend N and the divisor D are plus, N−(approximate quotient)×D≧0 is ensured. In contrast, the foregoing correction of +1 before the discard results in that N−(approximate quotient)×D<0 can take place.

In order to avoid this drawback, $Q_H$ obtained by the foregoing correction is further subjected to the following correction (Japanese Patent Application Laying-open No. 54-162936):

(1) When the extra n digits are neither all '0' nor all '1', $Q_H$ is provided as the final quotient.

(2) When the extra n digits are all '0' or all '1', $$R = N - Q_H \times D \tag{9}$$

is calculated at a precision of 2·m digits being double the number m of the floating-point significant digits. For R≧0, $Q_H$ is provided as the final quotient, and for R<0, $Q_H - 2^{-m}$ is provided as the final quotient.

By performing the two stages of correction processing as stated above, the same result as in the method finding the quotient by repeating the subtractions has been obtained.

Such correction system hitherto used for obtaining the correct quotient in the division method which finds the approximate quotient by repeated multiplications, does not take into account the desire to process the division of vector data at high speed with a pipeline. In introducing the prior-art correction system into the pipeline processing, the following problems are posed.

First, the comparing operation of $N - Q_H \times D \gtreqless 0$ needs to be carried out at the precision double the number m of the significant digits in the floating point notation, so that an adder at the precision of the 2·m digits needs to be provided. Moreover, signal lines for the delivery of data at double precision are required between the adder of double precision and a multiplier for executing $Q_H \times D$.

Secondly, the correction system hitherto used does not take the pipeline processing into consideration, and a multiplier required for the correction processing and a multiplier for calculating the approximate quotient $Q_H$ are common in many cases. In order to perform the correction processing with the pipeline continuously with the calculation of the approximate quotient $Q_H$, a plurality of multipliers are necessary. In a data processor having an insufficient number of multipliers, the processing for calculating the approximate quotient $Q_H$ and the correction processing of the approximate quotient $Q_H$ cannot be executed continuously, and there is required the processing of once writing the approximate quotient $Q_H$ into a storage device or the like and making the correction by reading it out again. In this case, in order to perform the correction processing with the pipeline, the operation of $N - Q_H \times D$ is required as to the dividend N, the approximate quotient $Q_H$ and the divisor D, and the three elements consisting of the dividend N, the divisor D and the approximate quotient $Q_H$ need to be entered into an arithmetic unit. This also brings about the problem that a conventional arithmetic unit having 2 inputs and 1 output, and instructions of the format which appoints 2 input operands and 1 output operand with one instruction cannot be used as they are. Moreover, in the case where the calculation of the approximate quotient and the correction processing thereof are not performed continuously and where the correction processing is executed by once writing the approximate quotient $Q_H$ into the storage device or the like and reading it out again, the data of the extra n digits obtained at the stage of the calculation of the approximate quotient needs to be kept stored in the storage device or the like because they are required for deciding the necessity for the correction processing, so that surplus data areas are necessary. Especially in a vector processor of the type which stores operation data in a vector register, there occurs the problem that the capacity of the vector register must be made large.

SUMMARY OF THE INVENTION

An object of the present invention is to provide a division correction circuit which can correct with simple circuitry an approximate quotient obtained by adopting the division method that evaluates the approximate quotient by repeated multiplications. Another object of the present invention is to provide a division correction circuit which can make the correction in a pipeline mode.

In order to accomplish these objects, the present invention performs the correction that an approximate quotient $Q_H$, a divisor D, and the least significant bit of the fraction part of a dividend N are read out, that the approximate quotient $Q_H$ and the divisor D are multiplied, that it is determined whether the lower m digits of $Q_H \times D$ are not all '0' and the coincidence between the m-th significant bit of $Q_H \times D$ and the m-th significant bit of N is detected, and that when the result of the decision is positive, $Q_H - 2^{-m}$ is provided as a quotient.

DETAILED DESCRIPTION OF THE PREFERRED EMBODIMENT

The principle of the present invention is as stated below. The calculation of an approximate quotient is performed similarly to the prior-art system in such a way that a first approximate quotient $Q_{m+n}$ is found by repeated multiplications at the precision at which an error develops at a place n digits lower than the number m of significant digits and that a value obtained by adding 1 (one) to the least significant bit ((m+n)-th digit) of $Q_{m+n}$ and discarding places lower than the m-th digit becomes the second approximate quotient $Q_H$.

This value $Q_H$ is a correction finished value as to the case where $Q_{m+n}$ contains the error of −1 and where the extra n digits are all '1', and the case where the extra n digits are neither all '0' nor all '1'.

In order to obtain a correct quotient, a correction processing is further required for the value $Q_H$ (1) when the extra n digits obtained in the calculation of the approximate quotient are all '1', and besides, the error of 0 or +1 develops, and (2) when the extra n digits obtained in the calculation of the approximate quotient are all '0', and besides, the error of +1 develops.

In both cases, the correction processing of subtracting 1 (one) from the least significant bit (m-th digit) of $Q_H$ is needed.

According to the correction system in the present invention, the case requiring the correction is distinguished from the least significant bit of the dividend N, the divisor D and the approximate quotient $Q_H$, not from the result of the comparing operation employing the 2·m digits indicated in Expression (9) as in the prior-art system. That is, it is considered that "the case requiring the correction is a time when the lower m digits of the 2·m digits obtained as the result of the multiplication between the divisor D and the approximate quotient $Q_H$ are not all '0', and besides, the m-th significant bit of $D \times Q_H$ coincides with the m-th significant bit of the dividend N", and the correction processing of subtracting 1 (one) from the least significant bit of the approximate quotient $Q_H$ is carried out at this time.

Next, it will be indicated that the cases requiring the correction of the approximate quotient $Q_H$ are the aforementioned cases.

Now, let N denote the dividend, D the divisor, $Q_m$ the value of the upper m digits of the quotient obtained by repeating the multiplications to the precision at which the error of ±1 develops in the place being the n digits lower than the number m of the significant digits, and $Q_{m+n}$ the value of the quotient including the extra n digits (FIG. 1). Letting q denote the true quotient, the value of the upper m digits thereof is denoted by $q_m$, the value of the upper (m+n) digits thereof by $q_{m+n}$, and the value of the digits thereof below the (m+n)-th digit by $q_\alpha$. Supposing that the most significant bit is the place of $2^{-1}$, the following holds:

$$q = q_{m+n} + q_\alpha \qquad (10)$$

$$0 \leq q_\alpha < 2^{-(m+n)} \qquad (10')$$

The following relations hold between $Q_{m+n}$ and $q_{m+n}$, depending upon whether the error of the (m+n)-th digit is 0, +1 or −1:

(1) when the error is 0, $$q_{m+n} = Q_{m+n} \qquad (11)$$

(2) when the error is +1, $$q_{m+n} = Q_{m+n} - 2^{-(m+n)} \qquad (12)$$

(3) when the error is −1, $$q_{m+n} = Q_{m+n} + 2^{-(m+n)} \qquad (13)$$

The approximate quotient $Q_H$ which is obtained by adding 1 (one) to the least significant bit of $Q_{m+n}$ and discarding the digits below the m-th digit has the following relations, depending upon the value of the extra n digits:

(1) when the extra n digits are all '0', $$Q_H = Q_m = Q_{m+n} \qquad (14)$$

(2) when the extra n digits are all '1', $$Q_H = Q_m + 2^{-m} = Q_{m+n} + 2^{-(m+n)} \qquad (15)$$

(3) when the extra n digits are neither all '0' nor all '1', $$Q_H = Q_m \qquad (16)$$

From the relations listed above, the following relational expressions can be deduced among the dividend N, the divisor D and the approximate quotient $Q_H$, depending upon the error having developed and the value of the extra n digits:

(1) where the extra n digits are all '0',
(a) when the error is 0, $$N = D \times Q_H + D \times q_\alpha \qquad (17)$$

(b) when the error is +1, $$N + D \times (2^{-(m+n)} - q_\alpha) = D \times Q_H \qquad (18)$$

(c) when the error is −1, $$N = D \times Q_H + D \times (2^{-(m+n)} + q_\alpha) \qquad (19)$$

(2) where the extra n digits are all '1',
(a) when the error is 0, $$N + D \times (2^{-(m+n)} - q_\alpha) = D \times Q_H \qquad (20)$$

(b) when the error is +1, $$N + D \times (2^{-(m+n-1)} - q_\alpha) = D \times Q_H \qquad (21)$$

(c) when the error is −1, $$N = D \times Q_H + D \times q_\alpha \qquad (22)$$

(3) where the extra n digits are neither all '0' nor all '1', in this case, irrespective of whether the error is 0 or ±1, the relation of $Q_H = Q_m = q_m$ affords $$N = D \times Q_H + D \times (q_{m+n} - q_m + q_\alpha) \qquad (23)$$

Here, Expressions (17) to (23) can be classified into the following two forms:

Class 1: $N + \alpha = D \times Q_H \qquad (24)$

Class 2: $N = D \times Q_H + \beta \qquad (25)$

Expressions (18), (20) and (21) belong to Class 1, and $\alpha$'s in the respective cases become as follows:

$$\left. \begin{array}{l} \alpha = D \times (2^{-(m+n)} - q_\alpha) \\ \alpha = D \times (2^{-(m+n)} - q_\alpha) \\ \alpha = D \times (2^{-(m+n-1)} - q_\alpha) \end{array} \right\} \qquad (26)$$

Expressions (17), (19), (22) and (23) belong to Class 2, and $\beta$'s in the respective cases become as follows:

$$\left. \begin{array}{l} \beta = D \times q_\alpha \\ \beta = D \times (2^{-(m+n)} + q_\alpha) \\ \beta = D \times q_\alpha \end{array} \right\} \qquad (27)$$

-continued
$$\beta = D \times (q_{m+}{}^n - q_m + q_a)$$

When Expression (10') is considered, $\alpha < 0$ holds in Expressions (26), and when Expression (10'), $D < 1$ and $n \geq 1$ are considered, $\alpha < 2^{-m}$ holds. Accordingly, $$0 < \alpha < 2^{-m}$$

holds. In addition, when Expression (10'), $D < 1$, $0 \leq q_{m+n}$ and $-q_m < 2^{-m}$ are considered, $$0 \leq \beta < 2^{-m}$$

holds.

Class 1 corresponds to the case where the extra n digits obtained in the stage of the calculation of the approximate quotient are all '0' and where the error of $+1$ is involved, and the case where the extra n digits are all '1' and where the error of 0 or $+1$ is involved. These are the cases requiring the correction processing for the approximate quotient $Q_H$. In Class 1, since $\alpha \neq 0$, the lower m digits of the result of $D \times Q_H$ must not be all '0', and besides, since $\alpha < 2^{-m}$, the m-th digit of the dividend N coincides with the m-th digit of $D \times Q_H$. In Class 2, if $\beta = 0$, the lower m digits of the result of $D \times Q_H$ are all '0', and besides, the m-th digit of the dividend N coincides with the m-th digit of $D \times Q_H$. If $\beta \neq 0$, Expression (25) holds in a case where a carry arises in consequence of the addition between the lower m digits of $D \times Q_H$ and $\beta$ and where the lower m digits become all '0'. At this time, the lower m digits of $D \times Q_H$ are not all '0', and besides, the m-th digit of the dividend N does not coincide with the m-th digit of $D \times Q_H$.

Classes 1 and 2 can accordingly be distinguished depending upon "whether or not the lower m digits of the result of $D \times Q_H$ are all '0', and whether or not the m-th digit of the dividend N coincides with the m-th digit of $D \times Q_H$".

Figure 2:
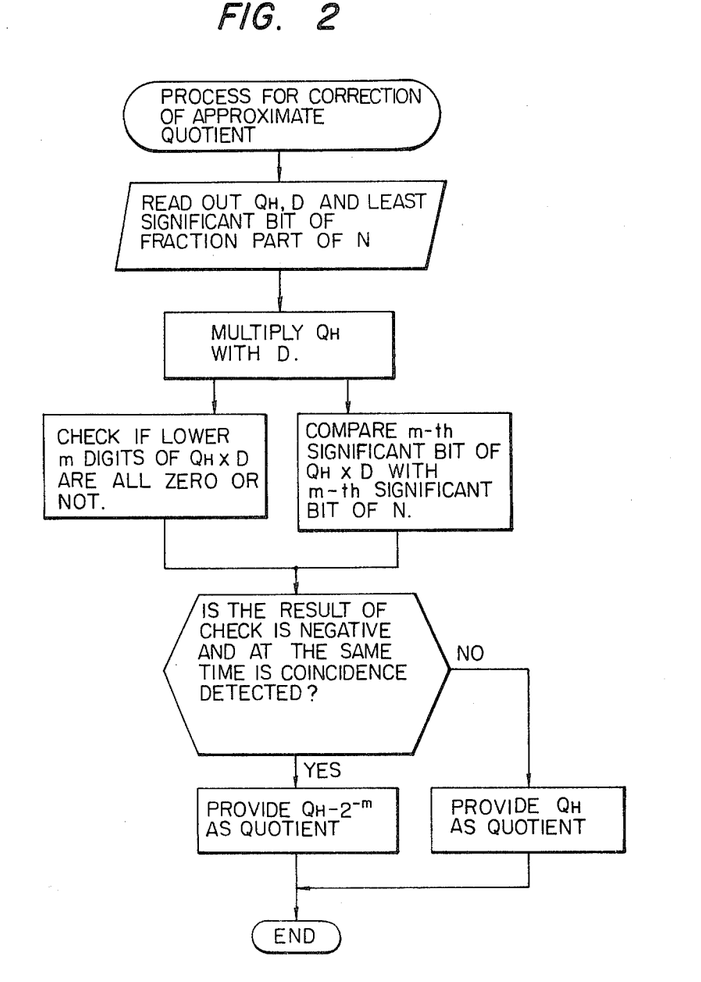
FIG. 2 is a flow chart showing the correction processing procedure of an approximate quotient in the present invention.

The flow of the approximate quotient-correcting processing in the present invention as based on the above principle is illustrated in FIG. 2.

Now, the contents of the present invention will be described in detail in conjunction with an embodiment.

Figure 3:
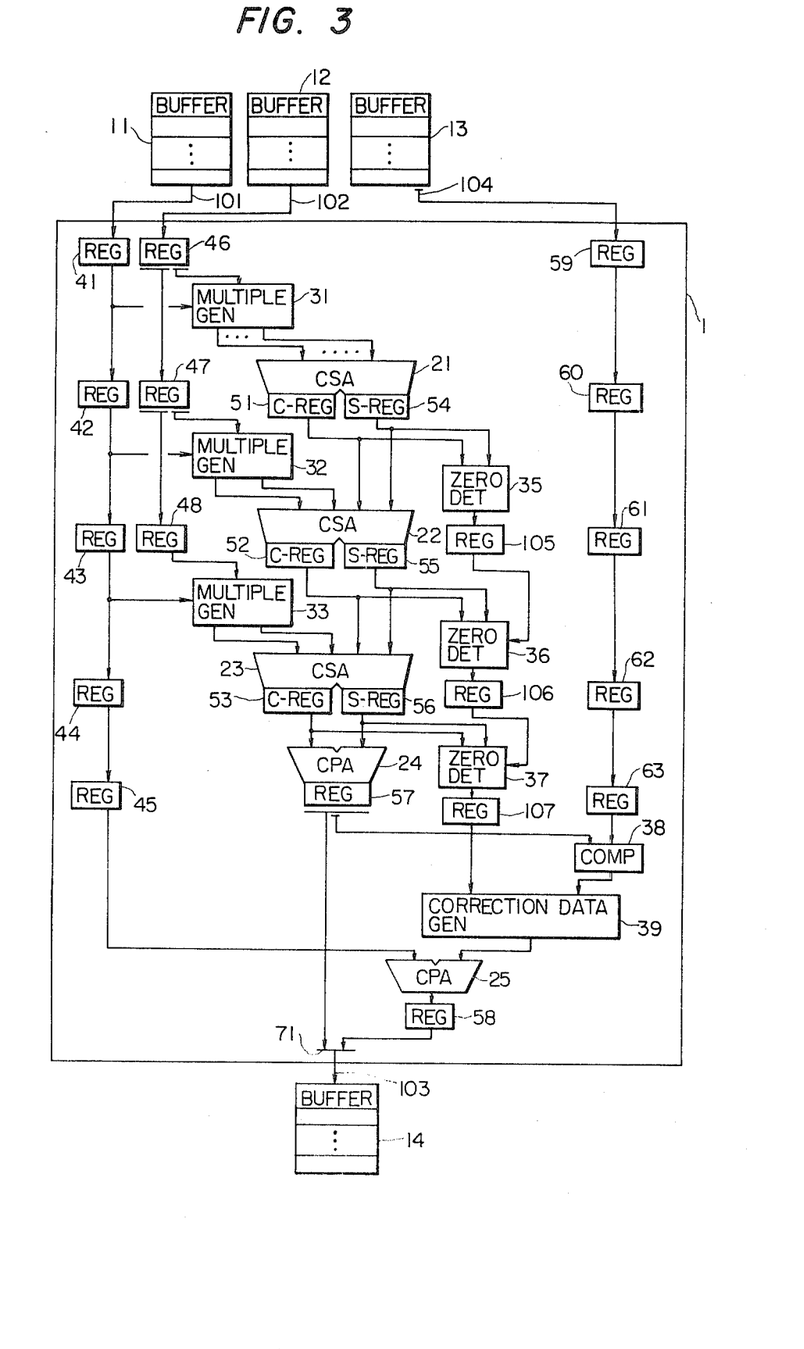
FIG. 3 is a block diagram showing an embodiment of the present invention.

FIG. 3 shows the embodiment of the present invention. Numeral 1 designates an arithmetic circuit in which a division processing function is added to a conventional pipelined high-speed multiplier. It can perform an ordinary multiplication processing with a pipeline at high speed, and can also perform the calculation of an approximate quotient and a correction processing with the pipeline at high speed. Numerals 11-14 designate vector data buffers (vector registers), which can store vector data, respectively. The respective vector data buffers are distinguished by such means as vector data buffer Nos. Here, only the four buffers necessary for the description are shown. Each buffer is so constructed that, when appointed, it stores or delivers the continuous elements of the vector data successively every machine cycle. Numerals 101 and 102 indicate data buses which supply the vector data from the respective data buffers 11 and 12 to the arithmetic circuit 1, numeral 103 a bus which sends an operated result from the arithmetic circuit 1 to the vector data buffer 14, and numeral 104 a 1-bit data line which is used in the approximate quotient-correcting processing and which supplies the least significant bit of the data of the vector data buffer 13 to the arithmetic circuit 1. Numerals 21-23 indicate groups of carry save adders (hereinbelow, abbreviated to "CSAs"), numerals 24 and 25 indicate carry propagate adders, numerals 31-33 indicate multiple generators, numerals 35-37 indicate zero detectors, numeral 38 indicate a 1-bit comparator, and numeral 39 indicates a correction data generator. The circuits 35-39 are used in the approximate quotient correction processing. Numerals 41-48 denote registers, numerals 51-53 denote partial carry registers of the CSA groups 21-23, respectively, numerals 54-56 denote partial sum registers of the CSA groups 21-23, respectively, numerals 57 and 58 indicate output registers of the carry propagate adders 24 and 25, respectively, numerals 59-63 indicate 1-bit registers, and numeral 71 denotes a selector.

The arithmetic circuit 1 is an arithmetic circuit which operates in the pipeline mode, to calculate on vector data successively supplied at 1-machine-cycle pitches from the buffers 11, 12 and 13 and to successively transmit the results to the buffer 14 at 1-machine-cycle pitches. It is now assumed that a plurality of approximate quotients $Q_H$ have already been stored in the vector data buffer 11, that the same number of divisors D have been stored in the vector data buffer 12, and that the same number of dividends N have been stored in the vector data buffer 13. $Q_H$'s, D's and N's which lie in the corresponding positions of the buffers 11-13 are for the same divisions. For the sake of brevity, a circuit for calculating the approximate quotient $Q_H$ is omitted from the illustration. (In, for example, Japanese Patent Application Laying-open No. 54-162936, a circuit for calculating the approximate quotient $Q_H$ in a non-pipeline mode is disclosed, but a circuit can also be constructed so as to calculate the approximate quotient $Q_H$ in the pipeline mode.) Each of $Q_H$, D and N is a fraction part in the floating point notation, which consists of m digits and the most significant bit of which is supposed the place of $2^{-1}$. The buffers 11-13 store also exponent parts corresponding to the fraction parts. Since, however, the exponent parts are not directly pertinent to the following description, they are not particularly explained in detail. When the approximate quotient correction processing is called for, the approximate quotients $Q_H$'s and the divisors D's corresponding to each other are supplied from the vector data buffers 11 and 12 through the data buses 101 and 102 to the arithmetic circuit 1 at 1-machine-cycle pitches one by one and set into the registers 41 and 46, respectively. Each of these registers consists of m bits. In synchronism with the above, the data of the least significant bits of the dividends N which are stored in the vector data buffer 13 and which correspond to these approximate quotients and divisors are successively sent to the arithmetic circuit 1 through the data bus 104 at 1-machine-cycle pitches and are set into the register 59. In the approximate quotient correction processing, it is necessary to execute the multiplication of $D \times Q_H$ and to check if the lower m digits (m denotes the number of the significant digits of the fraction part in the floating point notation) of the obtained result are all '0'. As stated below, the multiplication processing of $D \times Q_H$ is executed with the pipeline. The multiplication system is substantially the same as a hitherto used method, in which a multiplier is split, multiples generated by each of the multiple generators 31-33 are added by the CSA groups 21-23 so as to obtain partial products, and the partial products are further added so as to obtain a complete product. In the arithmetic circuit 1, the multiplier is split into three, three partial products are obtained, and they are added up to obtain the complete product. More specifically, in a certain machine cycle, the approximate quotient $Q_H$ of m digits is set from the vector data buffer 11 through the data bus 101 into the register 41, while the divisor D of m digits is set from the vector data buffer 12 through the data bus 102 into the register 46. In the next machine cycle, the approximate quotient $Q_H$ and the least significant bit-side one $D_1$ (m/3 digits) of the three split parts of the divisor D are applied to the multiple generator 31 so as to generate a plurality of multiples determined by these inputs. The multiples are added by the CSA group 21, and the first partial product, which is equal to a product of the approxmate quotient $Q_H$ and the first part $D_1$ is obtained with a carry set in the register 51 and a sum set in the register 54. At the time when the carry and sum are set into the respective registers 51 and 54, the approximate quotient $Q_H$ having been set in the register 41 is set into the register 42, and in the divisor D having been set in the register 46, the other parts than the least significant bit-side part $D_1$ of the three split parts are set into the register 47. In parallel therewith, the next approximate quotient $Q_H$ and divisor D are respectively sent from the vector data buffers 11 and 12 and set into the registers 41 and 46. The first approximate quotient $Q_H$ set in the register 42 and the middle part $D_2$ of the three split parts of the divisor D set in the register 47 are applied to the multiple generator 32 so as to generate multiples. The multiple generator 32 is the same as the multiple generator 31. These multiples and the carry and sum of the first partial product set in the respective registers 51 and 54 are applied to the CSA group 22, which is similar to CSA group 21, and added therein, so that a carry and a sum are respectively set into the registers 52 and 55. In consequence, the second partial product is obtained in the machine cycle subsequent to the machine cycle in which the first partial product has been obtained. The first and second least significant m/3 digits and the most significant m digits of the second partial product respectively represents first and second least significant m/3 digits and a non-determined value of m digits adjacent the above-mentioned two m/3 digits of the $Q_H \times D$ of 2 m digits. In parallel with the above, the first partial product for the next vector data set in the registers 41 and 46 is found by the use of the multiple generator 31 and the CSA group 21, and its carry and sum are set into the respective registers 51 and 54. At the time when the second partial product is set into the registers 52 and 55, the content of the register 42 is set into the register 43, and the most significant bit-side part of the three split parts of the divisor D in the register 47 is set into the register 48. Meantime, the contents of the registers 41 and 46 are respectively shifted into the registers 42 and 47. Using the registers 43 and 48, the multiple generator 33, which is the same as the multiple generator 32, the registers 52 and 55 and the CSA group 23, which is similar to the CSA group 21, the third partial product of 2 m digits is obtained and set into the registers 53 and 56 in the next machine cycle. The third partial product represents a determined value of the 2 m digit complete product $Q_H \times D$. In this manner, the first partial product of the data set in the registers 41 and 46 is obtained with the multiple generator 31 and the CSA group 21, the second partial product of the data set in the registers 42 and 47 is obtained with the multiple generator 32 and the CSA group 22, and the third partial product of the data set in the registers 43 and 48 is obtained with the multiple generator 33 and the CSA group 23. Among the vector data supplied to the arithmetic circuit 1 in succession, the n-th elements, (n+1)-th elements and (n+2)-th elements have the respective third partial product, second partial product and first partial product calculated in parallel, and the pipeline processings are performed as the entire arithmetic circuit. The carry and sum of the third partial product obtained in the respective registers 53 and 56 are added by the carry propagate adder 24, to find the complete product of 2·m digits, which is set into the register 57 in the next machine cycle.

If the lower m digits of the result of the multiplication ($Q_H \times D$) are all '0', this is checked in the pipeline mode by the use of the zero detectors 35-37, not by referring to the lower m digits of the calculated result obtained in the register 57. In other words, it is utilized that lower digits in the final calculation result become definite in the stages of calculating the partial products. In the arithmetic circuit 1, the lower m/3 digits of the final calculation result become definite in the first partial product, the higher m/3 digits thereof in the second partial product, and the still higher m/3 digits thereof in the third partial product. Whether or not the respective m/3 digits are all '0', is checked in the zero detectors 35, 36 and 37. The zero detector 35 receives the lowest m/3 digits of the registers 51 and 54 and adds them, decodes the result of m/3 digits with the carry of the highest digit neglected in the m/3 digits obtained by the addition, and provides '1' when the result is all '0'. This output is set into a register 105 when the data of the second partial product are set into the registers 52 and 55. The zero detector 36 receives the second-lowest m/3 digits of the registers 52 and 55 (the data of the 2·m/3-th digit as reckoned from the least significant bit, to the data of the (m/3+1)-th digit as reckoned from the same) and adds them, and it provides '1' when the result of m/3 digits with the carry of the highest digit neglected in the m/3 digits obtained by the addition is '0' and besides the input from the register 105 is '1'. This output is set into a register 106 when the data of the third partial product are set into the registers 53 and 56. The zero detector 37 is the same circuit as the zero detector 36. That is, it receives the third-lowest m/3 digits of the registers 53 and 56 (the data of the m-th digit as reckoned from the least significant bit, to the data of the (2·m/3+1)-th digit as reckoned from the same) and adds them, and it provides '1' when the result of m/3 digits with the carry of the highest digit neglected in the m/3 digits obtained by the addition is '0' and besides the input from the register 106 is '1'. This output is set into a register 107 when the complete product is set into the register 57. In this manner, the register 105 stores 1 (one) when the data of the m/3 digits on the least significant bit side of the product $Q_H \times D$ of 2 m digits are '0', the register 106 stores 1 (one) when the data of the (2·m)/3 digits on the least significant bit side of the product are '0', and the register 107 stores 1 (one) when the data of the m digits on the least significant bit side of the product are '0'. Accordingly, whether or not the lower m digits of the product $Q_H \times D$ are all '0' can be known from the output of the register 107.

The zero detectors 35-37 are pipeline-controlled. In a parallel fashion, the zero detector 37 performs the zero check of the lower digits made definite by the third partial product of the n-th elements of the vector data, the zero detector 36 performs the zero check of the lower digits made definite by the second partial product of the (n+1)-th elements, and the zero detector 35 performs the zero check of the lower digits made definite by the first partial product of the (n+2)-th elements. Whether or not the lower m digits of the multiplication result of $D \times Q_H$ are all '0', is obtained from the register 107 at the same time that the result of $D \times Q_H$ is obtained in the register 57. By pipelining the all-'0' checks of the lower m digits of the result of $D \times Q_H$ in this manner, the all-'0' check of the m digits at one stroke is avoided.

The comparison between 1 bit of the m-th significant bit of the multiplication result of $Q_H \times D$ and 1 bit of the least significant bit of the dividend N, the comparison being another processing in the approximate quotient correction, is performed as stated below. The least significant bit of each of the dividends N's sent into the arithmetic circuit 1 along with the approximate quotients $Q_H$'s and divisors D's at 1-machine-cycle pitches is propagated through the registers 59-63 at the respective machine cycles as the calculation of $Q_H \times D$ is advanced by the pipeline processing. Thus, at the time when the result of $Q_H \times D$ is obtained in the register 57, the least significant bit of the corresponding dividend N is set in the register 63. Subsequently, the m-th digit of the result of $Q_H \times D$ obtained in the register 57 and the content of the register 63 are compared by the 1-bit comparator 38. The 1-bit comparator 38 provides '1' when the two 1-bit data applied thereto are coincident.

The correction data generator 39 is a circuit which generates an approximate quotient correction data on the basis of the outputs of the register 107 and the 1-bit comparator 38. In a case where the output of the register 107 is '0', that is, the lower m digits of the result of $Q_H \times D$ are not all '0', and besides, where the output of the 1-bit comparator 38 is '1', that is, the m-th significant bit of the result of $Q_H \times D$ is coincident with the least significant bit of the fraction part of the dividend D, the correction data generator 39 provides the approximate quotient correction data of m digits representative of '$-1$'. In any other case, it provides the data of m digits representative of the value 0 (zero).

The correction of the approximate quotient $Q_H$ with the output of the correction data generator 39 is made in the carry propagate adder 25. Each of the approximate quotients $Q_H$'s successively sent through the data bus 101 from the vector data buffer 11 is set into the register 41, it is transmitted to the registers 42, 43 and 44 at the respective machine cycles as the calculation of $Q_H \times D$ is put forward by the pipeline processing, and it is set in the register 45 at the time when the calculated result of $Q_H \times D$ is obtained in the register 57 and when the correction data is generated from the correction data generator 39. The approximate quotient $Q_H$ set in the register 45 and the correction data provided from the correction data generator 39 are sent to the carry propagate adder 25 so as to perform the correction processing. A correct quotient is obtained in the register 58, and it is sent to the vector data buffer 14 through the selector 71 as well as the data bus 103. The selector 71 is controlled so as to select the register 58 during the approximate quotient correction processing.

In order to execute the above-stated approximate quotient correction processing by the use of one instruction, it is necessary to appoint the vector data buffers, totaling four, in which the dividend N, the divisor D, the approximate quotient $Q_H$ and the correct quotient after the correction are stored. The instruction format appointing three operands as has hitherto been used in a vector processor is problematic. This drawback can be solved even with the prior-art instruction format appointing three operands, for example, in such a way that the approximate quotient $Q_H$ and the divisor D are necessarily stored in vector data buffers of continuous Nos. and that the vector data buffer storing the divisor D therein is implicitly appointed by the No. of the vector data buffer storing the approximate quotient $Q_H$ therein. It is supposed by way of example that an instruction word appointing the correction of the approximate quotient is VQA (Vector Quotient Adjust). It is also supposed that the first operand of the instruction word is used to appoint the vector data buffer for storing the correct quotient subjected to the correction, that the second operand is used to appoint the vector data buffer for storing the approximate quotient, and that the third operand is used to appoint the vector data buffer for storing the dividend. Herein, a control circuit (not shown) which decodes an instruction word for utilizing any vector data buffer or buffers and which selects the vector data buffer or buffers necessary for the execution of the instruction and connects it or them with the arithmetic circuit 1, is so constructed that when the instruction word VQA has been decoded, not only the vector data buffers appointed by the first to third operands of the instruction are selected, but also the buffer next to the vector data buffer appointed by the second operand is selected for reading out the divisor. Thus, the approximate quotient correction according to the present invention can be performed with one instruction.

The embodiment of FIG. 3 is used, not only for the approximate quotient correction processing according to the present invention, but also for the ordinary multiplication. When a multiplicand and a multiplier are stored in the respective buffers 11 and 12, a complete product is found in the pipeline mode and stored in the register 57 by the use of the registers 41-43 and 46-48, the multiple generators 31-33, the CSA groups 21-23, the registers 51-56 and the adder 24 as apparent from the description already made. Accordingly, when the selector 71 is controlled so as to select the content of the register 57 during the ordinary multiplication, the product is obtained from the selector 71. It can accordingly be said that the circuit of FIG. 3 has made it possible to execute the approximate quotient-correcting operation according to the present invention in the pipeline mode, merely by adding a small number of circuit constituents to a pipeline circuit for performing the ordinary multiplication.

The circuit for calculating the approximate quotient is not shown in FIG. 3. When this circuit is so constructed that it operates in the pipeline mode and that in synchronism with the delivery of the approximate quotient $Q_H$ therefrom, the least significant bits of the divisor D and the dividend N at that time are also delivered, then the calculation of the approximate quotient to the correction thereof can be continuously performed in a pipeline fashion by connecting the output ends of the least significant bits of the quantities $Q_H$, D and N to the registers 41, 46 and 59.

While the foregoing embodiment of the present invention concerns the division of data in the floating point notation, it is to be understood that the present invention is not restricted thereto.

As set forth above, according to the present invention, on the basis of the least significant bit of a dividend, a divisor D and an approximate quotient $Q_H$, the correction is made by:

(1) finding the multiplication result of $Q_H \times D$ to $2 \cdot m$ digits being double the number m of the significant digits, and checking if the lower m digits of the result are all '0', and (2) comparing one bit of the m-th digit of the multiplication result of $Q_H \times D$ and one bit of the least significant bit of the dividend N. Thus, the comparing operation of $N - Q_H \times D \gtreqless 0$ at the double precision is avoided. Further, the entire value of the dividend N necessary for the correction processing is not used, but only one bit of the least significant bit in the m significant digits thereof is used, whereby the number of operands necessary for the correction of the approximate quotient is reduced from 3 (three) in the prior-art system to 2 (two) in effect. Moreover, since the value of extra n digits obtained in the stage of calculating the approximate quotient is not used in the stage of deciding the necessity for the correction, the correction processing of the corrected quotient of the approximate quotient can be performed with simple circuitry and is readily pipelined.

What is claimed is:

1. A correction circuit for correcting a second approximate quotient derived from the higher m digits obtained by adding 1 (one) to the least significant bit of a first approximate quotient which has a number of significant digits larger than the number m of significant digits and which is derived on the basis of a given dividend and a given divisor at such a precision as to cause an error at said least significant bit thereof, comprising multiplication means for performing multiplication of said second approximate quotient of m significant digits for said given dividend and said given divisor each having m significant digits, with a precision of a number of significant digits double said number m of significant digits to produce the m higher digits of the product therebetween; means connected to said multiplication means for detecting if the lower m digits of said product are all zero; means for detecting coincidence between the m-th bit of said higher m digits as reckoned from the most significant bit thereof and the least significant bit of said dividend; and means for subtracting 1 (one) from the least significant bit of said second approximate quotient, thereby to correct said second approximate quotient, when the zero detection means does not detect zero while the coincidence detection means detects a coincidence.

2. A correction circuit for correcting a second approximate quotient according to claim 1, further comprising entry means for supplying different sets of said second approximate quotient, said divisor and said dividend in succession during respective machine cycles, and further including means for controlling said multiplication means, said zero detection means, said coincidence detection means and the correction means to operate in a pipeline mode so as to renew their outputs at the respective machine cycles, and in synchronism with one another.

3. A correction circuit for correcting a second approximate quotient according to claim 2, wherein said multiplication means comprises first and second registers to which different pairs of said second approximate quotient and said divisor are respectively applied every machine cycle, product calculation means connected to said first and second register for calculating the product of each pair of said second approximate quotient and said divisor in a predetermined number of machine cycles in a pipelined manner to provide the higher m digits of different products of the different pairs every machine cycle, and a third register which stores the calculated product every machine cycle; wherein said zero detection means includes means connected to said product calculation means for detecting in a pipelined manner if the lower m bits of the calculated product is zero, every machine cycle and delivers the result in synchronism with each setting of said higher m digits of each calculated product into said third register; wherein said coincidence detection means comprises a fourth register to which the m-th bit of said dividend as reckoned from said most significant bit thereof is applied every machine cycle, a fifth register, means for setting into said fifth register every mahine cycle the content of said fourth register delayed for a predetermined number of machine cycles, and means to compare the set content of said fifth register and the m-th bit of said third register as reckoned from the most significant bit thereof; and wherein said correction means comprises a sixth register, means for setting into said sixth register every machine cycle the content of said first register delayed for a predetermined number of machine cycles, and means responsive to outputs of said zero detection means, the comparison means and said sixth register every machine cycle for supplying data with 1 (one) subtracted from the least significant bit of said second approximate quotient provided from said sixth register, when said zero detection means does not detect zero and said comparison means detects a coincidence, and to deliver said second approximate quotient provided from said sixth register, at any other time.

4. A correction circuit for correcting a second approximate quotient according to claim 3, wherein said setting means within said coincidence detection means comprises a plurality of series connected seventh registers which are inserted between said fourth register and said fifth register; and wherein said setting means in said correction means comprises a plurality of series connected eighth registers which are inserted between said first and sixth registers.

5. A correction circuit for correcting a second approximate quotient according to claims 3 or 4, wherein the product calculation means comprises means to evaluate at every machine cycle the product between said second approximate quotient and each of the first to k-th partial data obtained by splitting either said second approximate quotient or said divisor into k segments and which lie at successively higher digits from the least significant bit side of said second approximate quotient or said divisor, thereby to calculate said product between said divisor and said second approximate quotient in the pipeline mode within the predetermined number of machine cycles; said product calculation means being composed of first to k-th partial product calculation means to perform operations of said first to k-th partial data respectively; said first partial product calculation means being composed of first operation means to calculate at every machine cycle a first partial product between said second approximate quotient in said first register and said first partial data of said divisor in said second register, and a first partial product register to store the output of said first operation means at every machine cycle; the second to k-th partial product calculation means including second to k-th operation means and second to k-th partial product registers respectively, said second to k-th operation means including means for evaluating the products between the corresponding partial data and said second approximate quotient every machine cycle respectively, to evaluate sums between the evaluated products and contents of the first to (k−1)-th partial product registers, respectively, and to deliver the evaluated sums as second to k-th partial products respectively, said product calculation means providing said k-th partial product as said product between said second approximate quotient and said divisor; said second to k-th registers comprising means to store the outputs of said second to k-th operation means at every machine cycle respectively; and wherein said zero detection means is composed of first to k-th zero detector circuits disposed in correspondence with said first to k-th registers, respectively, and first to k-th zero detection registers for storing outputs of the respective detector circuits; said first zero detector circuit providing a zero detection signal when data lying at a predetermined digit position on a least significant bit side within said first partial product register is zero; said second to k-th zero detector circuits providing zero detection signals when data lying at predetermined digit positions within said first to k-th partial product registers, said digit positions being set for the respective partial product registers, are zero and besides outputs of the preceding zero detection registers are the zero detection signals, respectively; said zero detection means providing the output of said k-th zero register as said zero detection signal.

6. A correction circuit for correcting a second approximate quotient according to claim 4, wherein said entry means comprises first to third storage means to store a plurality of second approximate quotients, a plurality of divisors and a plurality of dividends, respectively, and to provide said second approximate quotients, said divisors and said dividends in succession in a manner to deliver one element every machine cycle, respectively.

7. A correction circuit for an approximate quotient according to one of claims 3 or 4, wherein said entry means comprises at least three storage means to store a plurality of data, each said storage means providing one element of the stored data every machine cycle when started, and means for selecting one of said storage means and for connecting it to said first register, for selecting another of said storage means and for connecting it to said second register, and for selecting another of said storage means and for connecting it to said fourth register.

8. A circuit for correcting an approximate quotient obtained on the basis of a given divisor and a given dividend, comprising multiplier means for calculating the product between said approximate quotient and said divisor, means including a first decision circuit for determining whether or not first predetermined digits of said product fulfills a predetermined first condition, means including a second decision circuit for determining whether or not a predetermined digit of said dividend and a second predetermined digit of said product fulfills a predetermined second condition, and means connected to said first and second decision circuits for correcting said approximate quotient when said first and second decision circuits deliver signals indicative of the fulfillments of said first and second conditions, respectively.

9. An approximate quotient correcting circuit according to claim 8, wherein said multiplier unit comprises a plurality of serially-connected partial multiplier units, means for evaluating a plurality of partial products in a pipeline mode, first pipeline system for affording said approximate quotient to the respective partial multiplier units as a multiplicand, and a second pipeline system for affording the respective segments of said divisor to said partial multiplier units as a multiplexer; wherein said first decision circuit includes a plurality of first decision means connected to output parts of the corresponding partial multiplier units, respectively, and connected in series with one another for determining in the pipeline mode whether or not data of definitely-calculated digits of the partial products fulfill predetermined conditions, respectively, and additionally, whether or not preceding ones of said first decision means provide a predetermined value; wherein said second decision circuit comprises a third pipeline system for transmitting said predetermined digit of said dividend in the pipeline mode, and second decision means connected to an output part of said multiplier unit and an output part of said third pipeline system for deciding whether or not said dividend and data of a digit of said multiplier unit fulfill said second condition; and wherein the correction data delivery means comprises means to deliver the correction data of said approximate quotient provided from said first pipeline system, when both a final-stage one of said first decision means and said second decision means provide signals indicative of the fulfillment of the first and second conditions.

* * * * *